(12) United States Patent
Tsai et al.

(10) Patent No.: US 10,401,980 B2
(45) Date of Patent: Sep. 3, 2019

(54) MOUSE DEVICE WITH BUTTON FEEDBACK MECHANISM

(71) Applicant: Primax Electronics Ltd., Taipei (TW)

(72) Inventors: Yung-Ming Tsai, Taipei (TW); Chun-Che Wu, Taipei (TW); Yi-Te Chou, Taipei (TW); Chung-Yuan Chen, Taipei (TW)

(73) Assignee: PRIMAX ELECTRONICS LTD., Taipei (TW)

( * ) Notice: Subject to any disclaimer, the term of this patent is extended or adjusted under 35 U.S.C. 154(b) by 55 days.

(21) Appl. No.: 15/906,679

(22) Filed: Feb. 27, 2018

(65) Prior Publication Data

US 2019/0146600 A1    May 16, 2019

(30) Foreign Application Priority Data

Nov. 10, 2017  (TW) .............................. 106139035 A

(51) Int. Cl.
G06F 3/02      (2006.01)
G06F 3/0354    (2013.01)

(52) U.S. Cl.
CPC ........ G06F 3/03543 (2013.01); G06F 3/0202 (2013.01)

(58) Field of Classification Search
CPC .................................................... G06F 3/0202
USPC .......................................................... 345/163
See application file for complete search history.

(56) References Cited

U.S. PATENT DOCUMENTS

| 2002/0021277 | A1* | 2/2002 | Kramer | G06F 3/016 |
| | | | | 345/156 |
| 2003/0058219 | A1* | 3/2003 | Shaw | G06F 3/0338 |
| | | | | 345/161 |
| 2010/0171702 | A1* | 7/2010 | Cheng | G06F 3/03543 |
| | | | | 345/163 |
| 2018/0210564 | A1* | 7/2018 | Chen | G06F 3/03543 |

* cited by examiner

*Primary Examiner* — Long D Pham
(74) *Attorney, Agent, or Firm* — Kirton McConkie; Evan R. Witt

(57) ABSTRACT

A mouse device with a button feedback mechanism is provided. The mouse device includes a mouse body and a button module. The mouse body includes an upper case, a lower case and a hollow cylinder. The button module includes a button, an elastic element, an attracting element and a suspension arm. The elastic element is disposed within the hollow cylinder and located under the pressing part. The button is contacted with the elastic element. The attracting element is installed on the upper case. The suspension arm includes a connection segment and a free segment. The connection segment is penetrated through the hollow cylinder and connected with the elastic element. The free segment is located under the attracting element. Consequently, the mouse device provides the sound feedback and the touch feedback.

19 Claims, 6 Drawing Sheets

MOUSE DEVICE WITH BUTTON FEEDBACK MECHANISM

FIELD OF THE INVENTION

The present invention relates to a mouse device with a button feedback mechanism.

BACKGROUND OF THE INVENTION

During the process of editing a computer document, the user may press a button of a mouse device and thus an electronic document file to be edited is selected or opened. After the electronic document file is opened, the user may press a button of a mouse device and thus the object of the electronic document file to be edited is selected. Alternatively, during the computer drawing process, the user may press a button of a mouse device to select the object of the drawing interface or perform the drawing operation.

Conventionally, a mouse device comprises a mouse body, a roller module and a button module. The roller module and the button module are installed on the mouse body. The button module comprises two buttons, two springs and two button sensors. The springs are located under the corresponding buttons. The buttons are contacted with the corresponding button sensors. When one of the buttons is pressed down, the button sensor is triggered to generate a button signal and the spring under the button is compressed downwardly by the button. After the pressing force exerted on the button is released, the button is returned to its original position in response to the elastic force of the spring.

However, during the process of editing the electronic document file or during the computer drawing process, some problems occur. For example, after the button is pressed down, the user cannot accurately feel whether the button is returned to its original position and whether a next selecting action is allowable. For solving the problems, it is necessary to install a button feedback mechanism in the mouse device in order to enhance the tactile feel of operating the mouse device.

SUMMARY OF THE INVENTION

The present invention provides a mouse device with a button feedback mechanism.

In accordance with an aspect of the present invention, there is provided a mouse device with a button feedback mechanism. The mouse device includes a mouse body and a button module. The mouse body includes an upper case, a lower case and a hollow cylinder. The upper cover is covered on the lower case. An accommodation space is formed between the upper case and the lower case. The hollow cylinder is protruded from the upper case toward the accommodation space. The button module includes at least one button, at least one sensing element, at least one elastic element, at least one attracting element and at least one suspension arm. The button is covered on an outer surface of the upper cover. The button includes a pressing rod and a pressing part. The sensing element is disposed within the accommodation space and electrically connected with the mouse body. The pressing rod is contacted with the sensing element. The elastic element is disposed within the hollow cylinder and located under the pressing part. The pressing part is contacted with an end of the elastic element near the upper case. The attracting element is installed on the upper case. A first end of the suspension arm has a connection segment. A second end of the suspension arm has a free segment. The connection segment is penetrated through the hollow cylinder and connected with the elastic element. The free segment is located under the attracting element. When the free segment is attracted by the attracting element, the free segment is moved toward the attracting element. Since the sound feedback and the touch feedback are increased, the tactile feel to the user is enhanced.

In an embodiment, the upper case includes an opening, and the opening is located over the hollow cylinder and in communication with an inner portion of the hollow cylinder. The elastic element has a pressed end near the upper case. The pressed end is penetrated through the opening and exposed outside the upper case. The pressing part is contacted with the pressed end. Preferably, a guide groove is formed in a lateral wall of the hollow cylinder. The guide groove is in communication with the inner portion of the hollow cylinder. The connection segment is penetrated through the guide groove and connected with the elastic element. The connection segment is movable along the guide groove. The connection segment is located near the pressed end. The guide groove is formed in the hollow cylinder and located beside the button. Moreover, the guide groove is in communication with the opening. Consequently, the use life of the mouse device is increased.

In an embodiment, the mouse body further includes at least one hollow post, and the hollow post is protruded from the upper case toward the accommodation space. The attracting element is disposed within the hollow post and installed on the upper case. The free segment is located under a bottom side of the hollow post. When the free segment is attracted by the attracting element, the free segment is moved toward the bottom side of the hollow post. Preferably, a perforation is formed in a bottom side of the hollow post. When the free segment is attracted by the attracting element, the free segment is penetrated through the perforation and contacted with a bottom side of the attracting element. Preferably, a supporting part is formed on an inner surface of the hollow post. The attracting element is disposed on the supporting part. There is a position-limiting gap between a bottom side of the attracting element and the bottom side of the hollow post. An elongated slot is formed in a lateral wall of the hollow post and in communication with an inner portion of the hollow post. The free segment is inserted into the hollow post through the elongated slot and disposed within the position-limiting gap. The free segment is movable along the elongated slot.

In an embodiment, the button module further includes at least one adjusting member, and the adjusting member includes a screwing element and a support element. The support element is disposed within the hollow cylinder and located under the elastic element to support the elastic element. The screwing element is sequentially penetrated through the lower case and a bottom side of the hollow cylinder and connected with the support element. Consequently, the sound feedback or the touch feedback is adjustable according to the practical requirements.

In an embodiment, the adjusting member further includes a screw hole in the lower case and an aperture in the bottom side of the hollow cylinder, and the screwing element includes a head part and a thread part that is extended from the head part. After the thread part is driven into the screw hole from a bottom side of the lower case, the thread part is penetrated through the aperture and connected with the support element. Preferably, the adjusting member further includes a sleeve and a recess. The recess is formed in the lower case and located under the hollow sleeve. The sleeve is installed in the recess. The screw hole is formed in the lower case through the sleeve. The thread part is penetrated through the sleeve and driven into the screw hole. Preferably, the adjusting member further includes a receiving space. The receiving space is formed in the lower case, and the head part is accommodated within the receiving space.

In an embodiment, the recess is formed in the lower case and close to the hollow cylinder, the receiving space is formed in the lower case and away from the hollow cylinder, and the receiving space is in communication with the screw hole. Preferably, the adjusting member further includes a communication hole. The communication hole is formed in the lower case. The thread part is further penetrated through the communication hole. The communication hole is arranged between the recess and the receiving space. The recess and the receiving space are in communication with each other through the communication hole. Preferably, the support element includes a support plate. A first side of the support plate is connected with a top end of the thread part. A second side of the support plate is connected with the elastic element to support the elastic element. Preferably, the support plate includes a notch near the elastic element, and a bottom side of the elastic element is accommodated within the notch.

In an embodiment, the free segment is made of a metallic material, and the attracting element is an electromagnet. The button module further comprises a control unit. The control unit is disposed within the accommodation space and electrically connected with the mouse body. The control unit is electrically connected with the attracting element. Alternatively, the free segment is made of a metallic material, and the attracting element is a permanent magnet. Preferably, the elastic element is a spring.

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

Figure 1:
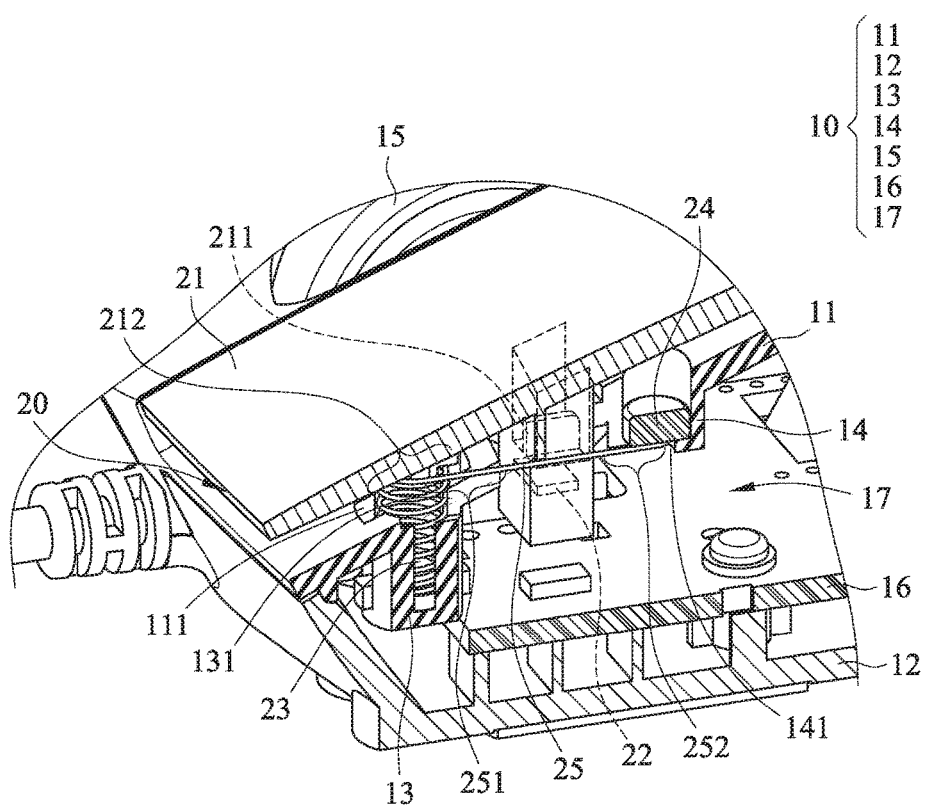
FIG. 1 is a schematic cutaway view illustrating a mouse device with a button feedback mechanism according to a first embodiment of the present invention.

FIG. 1 is a schematic cutaway view illustrating a mouse device with a button feedback mechanism according to a first embodiment of the present invention. The mouse device comprises a mouse body 10 and a button module 20.

The mouse body 10 comprises an upper case 11, a lower case 12, two hollow cylinders 13, two hollow posts 14, a roller module 15 and a circuit board 16. The upper case 11 is covered on the lower case 12. In addition, an accommodation space 17 is formed between the upper case 11 and the lower case 12. The hollow cylinders 13 and the hollow posts 14 are protruded from the upper case 11 toward the accommodation space 17. The upper case 11 comprises two openings 111. The openings 111 are located over the corresponding hollow cylinders 13. Moreover, the openings 111 are in communication with the inner portions of the corresponding hollow cylinders 13. A guide groove 131 is formed in a lateral wall of each hollow cylinder 13. The guide groove 131 is in communication with the inner portion of the corresponding hollow cylinder 13. The guide groove 131 is located at a side of the hollow cylinder 13 near the corresponding button 21. The guide groove 131 is also in communication with the corresponding opening 111. Moreover, a perforation 141 is formed in a bottom side of the corresponding hollow post 14.

The circuit board 16 is disposed within the accommodation space 17 and fixed on the lower case 12. The roller module 15 is disposed within the accommodation space 17. Moreover, a portion of an outer surface of the roller module 15 is penetrated through the upper case 11 and exposed outside the mouse body 10.

The button module 20 comprises two buttons 21, two sensing elements 22, two elastic elements 23, two attracting elements 24 and two suspension arms 25. The buttons 21 are covered on the outer surface of the upper case 11. Each button 21 comprises a pressing rod 211 and a pressing part 212. The pressing rod 211 is arranged between the corresponding hollow cylinder 13 and the corresponding hollow post 14. The sensing elements 22 are disposed within the accommodation space 17 and electrically connected with the circuit board 16. Each sensing element 22 is aligned with the corresponding pressing rod 211. The pressing rod 211 is penetrated through the upper case 11. The free end of the pressing rod 211 is disposed within the accommodation space 17 and contacted with the corresponding sensing element 22. For example, the sensing element 22 is a button sensor.

The elastic element 23 is disposed within the corresponding hollow cylinder 13 and located under the pressing part 212 of the corresponding button 21. The elastic element 23 has a pressed end 231 near the upper case 11. The pressed end 231 is penetrated through the corresponding opening 111 of the upper case 11 and exposed outside the upper case 11. Consequently, the pressing part 212 of the button 21 is contacted with the pressed end 231 of the corresponding elastic element 23. That is, the pressed end 231 of the elastic element 23 can be pressed by the corresponding pressing part 212. For example, the elastic element 23 is a spring.

The attracting element 24 is disposed within the corresponding hollow post 14. Since the attracting element 24 is disposed within the corresponding hollow post 14, the attracting element 24 is installed on the upper case 11. For example, the attracting element 24 is a permanent magnet.

A first end of the suspension arm 25 has a connection segment 251. A second end of the suspension arm 25 has a free segment 252. The connection segment 251 is penetrated through the guide groove 131 of the corresponding hollow cylinder 13. Moreover, the connection segment 251 is connected with the pressed end 231 of the elastic element 23. The connection segment 251 is movable along the corresponding guide groove 131. The free segment 252 is located under the bottom side of the corresponding hollow post 14. Since the free segment 252 is attracted by the corresponding attracting element 24 within the corresponding hollow post 14, the free segment 252 is movable toward the bottom side of the corresponding hollow post 14. When the free segment 252 is attracted by the corresponding attracting element 24, the free segment 252 is penetrated through the perforation 141 of the hollow post 14. Consequently, the free segment 252 is contacted with the bottom side of the attracting element 24 within the hollow post 14. In an embodiment, the free segment 252 is made of a metallic material. Alternatively, the free segment 252 is made of a metallic material contains a magnetic material such as iron, cobalt or nickel.

The operations of the mouse device will be described as follows. When a user's finger presses a button 21, the pressed button 21 is moved downwardly. As the button 21 is moved downwardly, the pressing rod 211 and the pressing part 212 of the button 21 are moved downwardly with the button 21. Since the sensing element 15 is pressed by the pressing rod 211, the sensing element 15 generates a button signal. Moreover, since the pressed end 231 of the corresponding elastic element 23 is pressed by the pressing part 212 of the button 21, the elastic element 23 is compressed in the direction away from the upper case 11. As the elastic element 23 is compressed, the suspension arm 25 is moved in the direction away from the upper case 11. Consequently, the free segment 252 of the suspension arm 25 is separated from the bottom side of the attracting element 24 and moved in the direction away from the attracting element 24. After the user's finger is separated from the button 21 and the pressing force exerted on the button is released, the button 21 is moved upwardly and restored to the non-pressed state in response to the elastic force of the elastic element 23. Moreover, the suspension arm 25 is moved upwardly with the elastic element 23. At the same time, the free segment 252 of the suspension arm 25 is attracted by the attracting element 24 and moved toward the attracting element 24. When the free segment 252 is penetrated through the perforation 141 of the hollow post 14 and contacted with the bottom side of the attracting element 24, the contact between the free segment 252 and the attracting element 24 results in a sound feedback. Since the free segment 252 is attracted by the attracting element 24, the moving speed of the free segment 252 toward the attracting element 24 is increased. Moreover, the contact between the free segment 252 and the attracting element 24 also results in the touch feedback. Because of the sound feedback and the touch feedback, the tactile feel to the user is enhanced.

Moreover, the length of elastic element 23 in the hollow cylinder 13 may be varied according to the practical requirements. The traveling distance of the button 21 is adjusted according to the length of the elastic element 23. In other words, the traveling distance of the button 21 is adjustable. Moreover, the elasticity coefficient of elastic element 23 in the hollow cylinder 13 may be varied according to the practical requirements. The pressing force of the button 21 is adjusted according to the elasticity coefficient of elastic element 23. In other words, the pressing force of the button 21 is adjustable. Consequently, the tactile feel is adjustable.

As mentioned above, the elastic element 23 is disposed within the hollow cylinder 13, and the attracting element 24 is disposed within the hollow post 14. Consequently, during the process of assembling or disassembling the mouse device, the elastic element 23 or the attracting element 24 can be easily and conveniently assembled or disassembled. Since the mouse device can be easily and conveniently assembled or disassembled, the maintenance process of the mouse device is simplified and the use life of the mouse device is prolonged.

Figure 2:
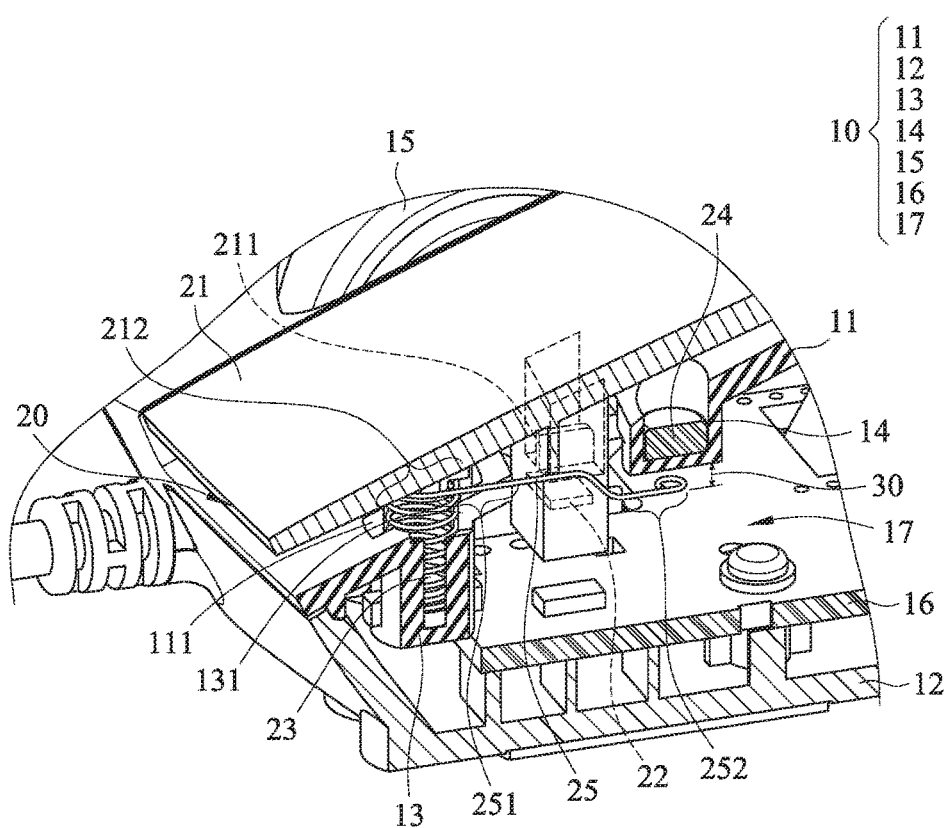
FIG. 2 is a schematic cutaway view illustrating a mouse device with a button feedback mechanism according to a second embodiment of the present invention.

FIG. 2 is a schematic cutaway view illustrating a mouse device with a button feedback mechanism according to a second embodiment of the present invention. In comparison with the above embodiment, the free segment 252 of the suspension arm 25 is not in direct contact with the attracting element 24 when the button 21 is not pressed down. That is, there is a spacing interval 30 between the free segment 252 and the bottom side of the attracting element 24 or the bottom side of the hollow post 14. After the button 21 is not pressed by the user and the user's finger is separated from the button 21, the free segment 252 is moved upwardly in response to the elastic force of the elastic element 23. At the same time, the free segment 252 of the suspension arm 25 is attracted by the attracting element 24 and moved toward the attracting element 24. Due to the spacing interval 30 between the free segment 252 and the bottom side of the attracting element 24 or the bottom side of the hollow post 14, the free segment 252 is moved to the position near the bottom side of the attracting element 24 or the bottom side of the hollow post 14 when the button 21 is restored to its original state by the elastic element 23. Since the free segment 252 is not in contact with the bottom side of the attracting element 24 or the bottom side of the hollow post 14, the sound feedback is not generated. However, the action of restoring the button 21 to its original state still results in the touch feedback. Since the mouse device of this embodiment is capable of reducing the noise and providing the touch feedback, the mouse device is suitably used as a silent mouse device and used in a place requiring quietness.

Figure 3:
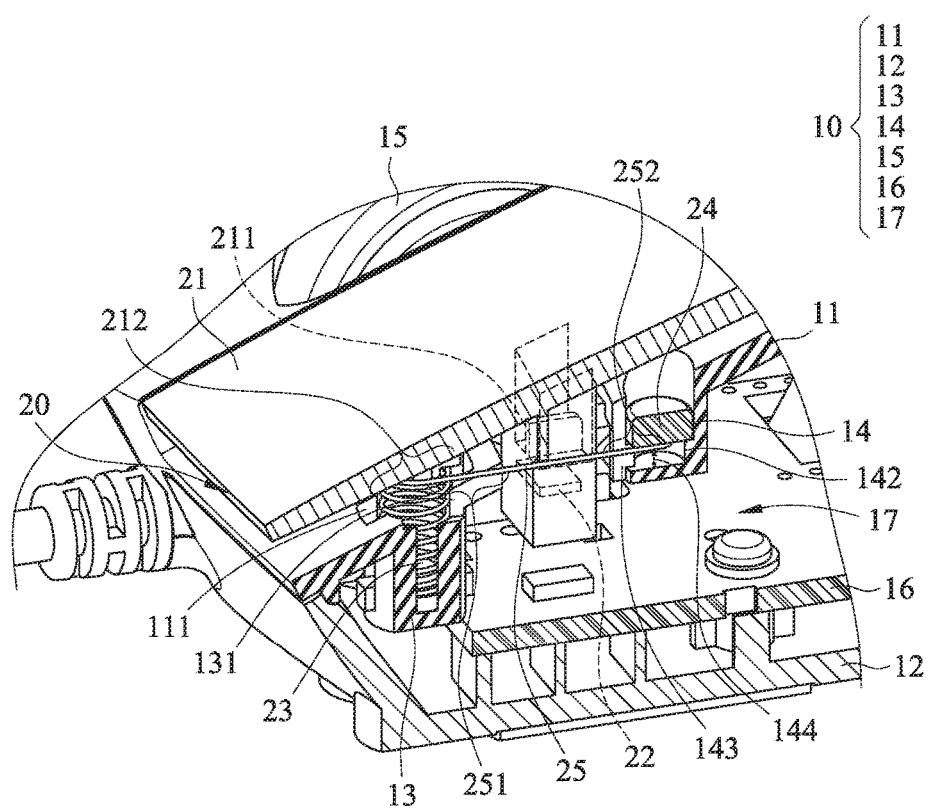
FIG. 3 is a schematic cutaway view illustrating a mouse device with a button feedback mechanism according to a third embodiment of the present invention.

FIG. 3 is a schematic cutaway view illustrating a mouse device with a button feedback mechanism according to a third embodiment of the present invention. In comparison with the above embodiments, a supporting part 142 is formed on an inner surface of the hollow post 14, and an elongated slot 143 is formed in a lateral wall of the hollow post 14. The elongated slot 143 is in communication with the inner portion of the hollow post 14. The attracting element 24 is disposed on the corresponding supporting part 142. Consequently, the attracting element 24 is supported by the supporting part 142, and there is a position-limiting gap 144 between the bottom side of the attracting element 24 and the bottom side of the hollow post 14. Consequently, the free segment 252 of the suspension arm 25 is inserted into the hollow post 14 through the elongated slot 143, and the free segment 252 is movable along the corresponding elongated slot 143. Since the free segment 252 is disposed within the corresponding position-limiting gap 144, the free segment 252 is movable within the corresponding position-limiting gap 144 only. When the button 21 is pressed down, the suspension arm 25 is moved downwardly with the elastic element 23. Consequently, the free segment 252 is moved in the direction away from the attracting element 24. When the free segment 252 is contacted with the bottom side of the hollow post 14, the free segment 252 is no longer moved downwardly. After the pressing force exerted on the button 21 is released, the free segment 252 is returned in response to the elastic force of the elastic element 23. The free segment 252 of the suspension arm 25 is attracted by the attracting element 24 and moved toward the attracting element 24 until the free segment 252 is contacted with the attracting element 24. Due to the arrangement of the supporting part 142, the movement of the free segment 252 is limited.

As mentioned above, the connection segment 251 is movable along the corresponding guide groove 131 and the free segment 252 is movable along the corresponding elongated slot 143. Consequently, while the suspension arm 25 is moved, the suspension arm 25 is moved along a linear path without deviation. Under this circumstance, the use lives of the elastic elements 23 and the suspension arms 25 are prolonged, and the tolerance of the pressed path of the button 21 is reduced. Consequently, the travelling distance of the button 21 is more accurate.

Figure 4:
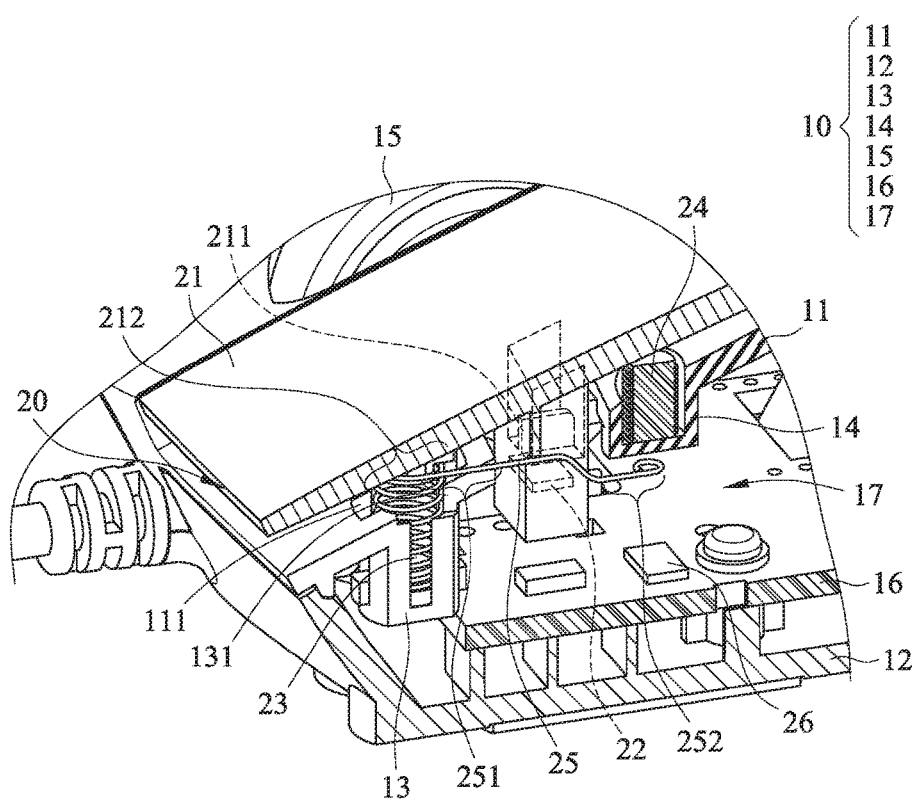
FIG. 4 is a schematic cutaway view illustrating a mouse device with a button feedback mechanism according to a fourth embodiment of the present invention.

FIG. 4 is a schematic cutaway view illustrating a mouse device with a button feedback mechanism according to a fourth embodiment of the present invention. In comparison with the above embodiments, the attracting element 24 is an electromagnet, and the button module 20 further comprises a control unit 26. The control unit 26 is disposed within the accommodation space 17 of the mouse body 10. The control unit 26 is installed on the circuit board 16 and electrically connected with the circuit board 16. For example, the control unit 26 is a microcontroller.

The control unit 26 drives the attracting element 24 to generate a magnetic field. Consequently, a magnetic force is generated between the attracting element 24 and the free segment 252 of the corresponding suspension arm 25. Due to the magnetic force, the free segment 252 is attracted by the corresponding attracting element 24. After the pressing force exerted on the button 21 is released, the free segment 252 is attracted by the corresponding attracting element 24 and moved toward the attracting element 24. Consequently, the free segment 252 is contacted with the corresponding attracting element 24 or moved to the position near the corresponding attracting element 24.

Moreover, the magnetic field of the attracting element 24 may be adjusted through the control unit 26. That is, the magnetic force between the attracting element 24 and the corresponding free segment 252 is varied according to the practical requirements. Consequently, the moving speed of the free segment 252 toward the corresponding attracting element 24 is changeable, and the contact between the free segment and the corresponding attracting element 24 results in a different contact force and a different contact sound. Since the magnetic field of the attracting element 24 is adjusted through the control unit 26, the touch feedback and the sound feedback are adjustable.

Figure 5:
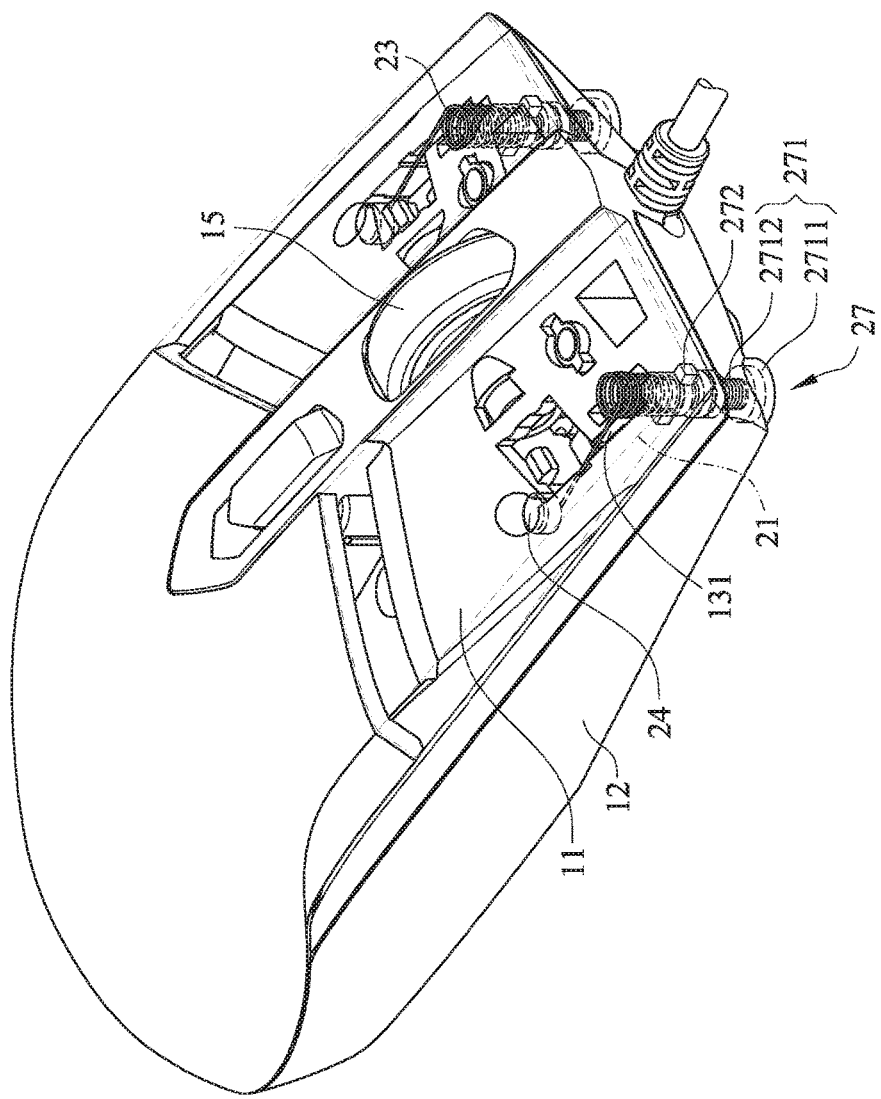
FIG. 5 is a schematic perspective view illustrating a mouse device with a button feedback mechanism according to a fifth embodiment of the present invention.
Figure 6:
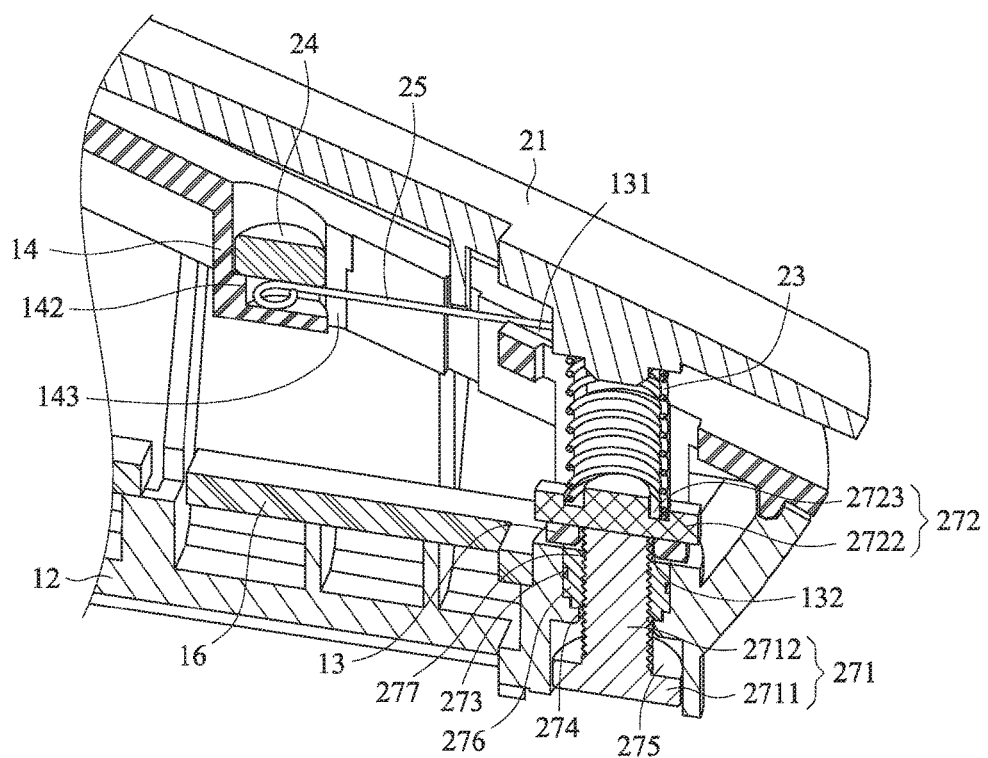
FIG. 6 is a schematic cutaway view illustrating the mouse device according to the fifth embodiment of the present invention.

FIG. 5 is a schematic perspective view illustrating a mouse device with a button feedback mechanism according to a fifth embodiment of the present invention. FIG. 6 is a schematic cutaway view illustrating the mouse device according to the fifth embodiment of the present invention. In comparison with the above embodiment, the button module 20 further comprises two adjusting members 27. Each adjusting member 27 comprises a screwing element 271, a support element 272, a recess 273, a communication hole 274, a receiving space 275, a sleeve 276 and a screw hole 277.

The screwing element 271 comprises a head part 2711 and a thread part 2712. The thread part 2712 is extended from the head part 2711.

The support element 272 is disposed within the corresponding hollow cylinder 13 and located under the elastic element 23. The support element 272 is used for supporting the corresponding elastic element 23. The support element 272 comprises a support plate 2722. The support plate 2722 is used for supporting the corresponding elastic element 23. The support plate 2722 comprises two notches 2723 near the elastic element 23. The bottom side of the elastic element 23 is received within the notches 2723. Moreover, an aperture 132 is formed in the bottom side of the corresponding hollow cylinder 13.

The recess 273, the communication hole 274 and the receiving space 275 are formed in the lower case 12. The recess 273 is located under the corresponding hollow cylinder 13. The communication hole 274 is in communication with the corresponding recess 273 and the corresponding receiving space 275. The communication hole 274 is arranged between the corresponding recess 273 and the corresponding receiving space 275. Moreover, the thread part 2712 is penetrated through the corresponding communication hole 274.

The sleeve 276 is installed within the corresponding recess 273. The screw hole 277 is formed in the corresponding sleeve 276. The recess 273 is formed in the lower case 12 and close to the hollow cylinder 13. The receiving space 275 is formed in the lower case 12 and away from the hollow cylinder 13. The receiving space 275 is in communication with the corresponding screw hole 277.

The head part 2711 of the screwing element 271 is accommodated within the corresponding receiving space 275. After the thread part 2712 of the screwing element 271 is penetrated through the communication hole 274 and driven into the screw hole 277 of the sleeve 276, the top end of the thread part 2712 is penetrated through the aperture 132 of the hollow cylinder 13 and connected with the corresponding support plate 2722.

The operation of the adjusting member will be described as follows. By rotating the head part 2711 of the screwing element 271, the thread part 2712 is correspondingly rotated. Since the support element 272 is pushed by the thread part 2712, the support element 272 is moved in the direction away from the bottom side of the hollow cylinder 13. In addition, the elastic element 23 is pushed by the support element 272 and moved in the direction toward the upper case 11. Consequently, the distance between the button 21 and the support plate 2722 is shortened. Since the elastic element 23 is compressed, the height of the elastic element 23 is reduced. Similarly, by reversely rotating the head part 2711 of the screwing element 271, the thread part 2712 is moved in the direction away from the upper case 11. Since the support element 272 is moved in the direction away from the upper case 11, the distance between the button 21 and the support plate 2722 is increased. Since the elastic element 23 is stretched, the height of the elastic element 23 is increased. In other words, the rotation of the screwing element 271 can adjust the height of the elastic element 23. Since the tightness of the elastic element 23 is adjustable, the travelling distance of the button 21 is adjustable and the pressing force of the button 21 is adjustable. In other words, the sound feedback or the touch feedback can be adjusted according to the practical requirements. Consequently, the tactile feel can be adjusted more easily.

From the above descriptions, the mouse device of the present invention has the following features. Firstly, the cooperation of the elastic element 23, the attracting element 24 and the suspension arm 25 generates the sound feedback and the touch feedback and provided enhanced tactile feel to the user while the button module 20 of the mouse device is used. Secondly, since the connection segment 251 is movable along the corresponding guide groove 131 and the free segment 252 is movable along the corresponding elongated slot 143, the tolerance of the pressed path of the button 21 is reduced and the travelling distance of the button 21 is more accurate. Thirdly, since the adjusting member 27 is capable of adjusting the tightness of the elastic element 23, the travelling distance of the button 21 is adjustable and the pressing force of the button 21 is adjustable. In other words, the sound feedback or the touch feedback can be adjusted according to the practical requirements.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims which are to be accorded with the broadest interpretation so as to encompass all modifications and similar structures.

What is claimed is:

1. A mouse device with a button feedback mechanism, the mouse device comprising:
a mouse body comprising an upper case, a lower case and a hollow cylinder, wherein the upper cover is covered on the lower case, an accommodation space is formed between the upper case and the lower case, and the hollow cylinder is protruded from the upper case toward the accommodation space; and
a button module comprising:
at least one button covered on an outer surface of the upper cover, wherein the button comprises a pressing rod and a pressing part;
at least one sensing element disposed within the accommodation space and electrically connected with the mouse body, wherein the pressing rod is contacted with the sensing element;
at least one elastic element disposed within the hollow cylinder and located under the pressing part, wherein the pressing part is contacted with an end of the elastic element near the upper case;
at least one attracting element installed on the upper case; and
at least one suspension arm, wherein a first end of the suspension arm has a connection segment, a second end of the suspension arm has a free segment, the connection segment is penetrated through the hollow cylinder and connected with the elastic element, and the free segment is located under the attracting element, wherein when the free segment is attracted by the attracting element, the free segment is moved toward the attracting element.

2. The mouse device according to claim 1, wherein the upper case comprises an opening, and the opening is located over the hollow cylinder and in communication with an inner portion of the hollow cylinder, wherein the elastic element has a pressed end near the upper case, the pressed end is penetrated through the opening and exposed outside the upper case, and the pressing part is contacted with the pressed end.

3. The mouse device according to claim 2, wherein a guide groove is formed in a lateral wall of the hollow cylinder, wherein the guide groove is in communication with the inner portion of the hollow cylinder, the connection segment is penetrated through the guide groove and connected with the elastic element, the connection segment is movable along the guide groove, and the connection segment is located near the pressed end.

4. The mouse device according to claim 3, wherein the guide groove is formed in the hollow cylinder and located beside the button, and the guide groove is in communication with the opening.

5. The mouse device according to claim 3, wherein the mouse body further comprises at least one hollow post, and the hollow post is protruded from the upper case toward the accommodation space, wherein the attracting element is disposed within the hollow post and installed on the upper case, and the free segment is located under a bottom side of the hollow post, wherein when the free segment is attracted by the attracting element, the free segment is moved toward the bottom side of the hollow post.

6. The mouse device according to claim 5, wherein a perforation is formed in a bottom side of the hollow post, wherein when the free segment is attracted by the attracting element, the free segment is penetrated through the perforation and contacted with a bottom side of the attracting element.

7. The mouse device according to claim 5, wherein a supporting part is formed on an inner surface of the hollow post, the attracting element is disposed on the supporting part, and there is a position-limiting gap between a bottom side of the attracting element and the bottom side of the hollow post, wherein an elongated slot is formed in a lateral wall of the hollow post and in communication with an inner portion of the hollow post, the free segment is inserted into the hollow post through the elongated slot and disposed within the position-limiting gap, and the free segment is movable along the elongated slot.

8. The mouse device according to claim 3, wherein the button module further comprises at least one adjusting member, and the adjusting member comprises a screwing element and a support element, wherein the support element is disposed within the hollow cylinder and located under the elastic element to support the elastic element, and the screwing element is sequentially penetrated through the lower case and a bottom side of the hollow cylinder and connected with the support element.

9. The mouse device according to claim 8, wherein the adjusting member further comprises a screw hole in the lower case and an aperture in the bottom side of the hollow cylinder, and the screwing element comprises a head part and a thread part that is extended from the head part, wherein after the thread part is driven into the screw hole from a bottom side of the lower case, the thread part is penetrated through the aperture and connected with the support element.

10. The mouse device according to claim 9, wherein the adjusting member further comprises a sleeve and a recess, wherein the recess is formed in the lower case and located under the hollow sleeve, the sleeve is installed in the recess, the screw hole is formed in the lower case through the sleeve, and the thread part is penetrated through the sleeve and driven into the screw hole.

11. The mouse device according to claim 10, wherein the adjusting member further comprises a receiving space, wherein the receiving space is formed in the lower case, and the head part is accommodated within the receiving space.

12. The mouse device according to claim 11, wherein the recess is formed in the lower case and close to the hollow cylinder, the receiving space is formed in the lower case and away from the hollow cylinder, and the receiving space is in communication with the screw hole.

13. The mouse device according to claim 12, wherein the adjusting member further comprises a communication hole, wherein the communication hole is formed in the lower case, the thread part is further penetrated through the communication hole, the communication hole is arranged between the recess and the receiving space, and the recess and the receiving space are in communication with each other through the communication hole.

14. The mouse device according to claim 8, wherein the support element comprises a support plate, wherein a first side of the support plate is connected with a top end of the thread part, and a second side of the support plate is connected with the elastic element to support the elastic element.

15. The mouse device according to claim 14, wherein the support plate comprises a notch near the elastic element, and a bottom side of the elastic element is accommodated within the notch.

16. The mouse device according to claim 1, wherein the free segment is made of a metallic material, and the attracting element is an electromagnet.

17. The mouse device according to claim 16, wherein the button module further comprises a control unit, wherein the control unit is disposed within the accommodation space and electrically connected with the mouse body, and the control unit is electrically connected with the attracting element.

18. The mouse device according to claim 1, wherein the free segment is made of a metallic material, and the attracting element is a permanent magnet.

19. The mouse device according to claim 1, wherein the elastic element is a spring.

* * * * *